United States Patent [19] [11] 3,842,805
Patz [45] Oct. 22, 1974

[54] OVERHEAD FEEDER CONVEYOR HAVING DOUBLE-TAPERED BED, REVERSIBLY DRIVABLE CHAIN-FLITE ASSEMBLY

[76] Inventor: Paul Patz, Pound, Wis.

[22] Filed: Sept. 26, 1973

[21] Appl. No.: 400,944

[52] U.S. Cl. ............................ 119/52 B, 119/52 AF
[51] Int. Cl. ........................................... A01k 05/02
[58] Field of Search ........... 119/52 AF, 52 B, 51.11, 119/56; 198/60, 65, 42

[56] References Cited
UNITED STATES PATENTS
2,841,115   7/1958   Weber ............................ 119/52 AF
2,914,023   11/1959  Pierre ............................. 119/52 AF
3,675,758   7/1972   Buschbom et al. ................ 119/52 B Primary Examiner—Hugh R. Chamblee
Attorney, Agent, or Firm—James E. Nilles

[57] ABSTRACT

An elongated cattle feeding bunk having a double-tapered bed with two sections which taper outwardly on both sides of an upper hopper. The feeder employs a chain-flite assembly comprising a single endless chain which extends the entire length of the bed and is reeved around an idler sprocket at one end of the bed and a driven sprocket on the other end of the bed. Flites are attached to the chain at intervals therealong to move the feed along one or the other bed sections, depending on the direction in which the chain is driven. The driven sprocket is driven by a selectively reversible electric motor. In operation, feed is supplied to the hopper from a suitable conventional conveyor and deposited on the bed intermediate its length and is moved along one tapered section when the chain is driven in one direction and moved along the other tapered bed section when the chain is driven in the opposite direction by reversal of the motor. In this manner feed is distributed in two stages along the entire length of the bunk.

5 Claims, 18 Drawing Figures

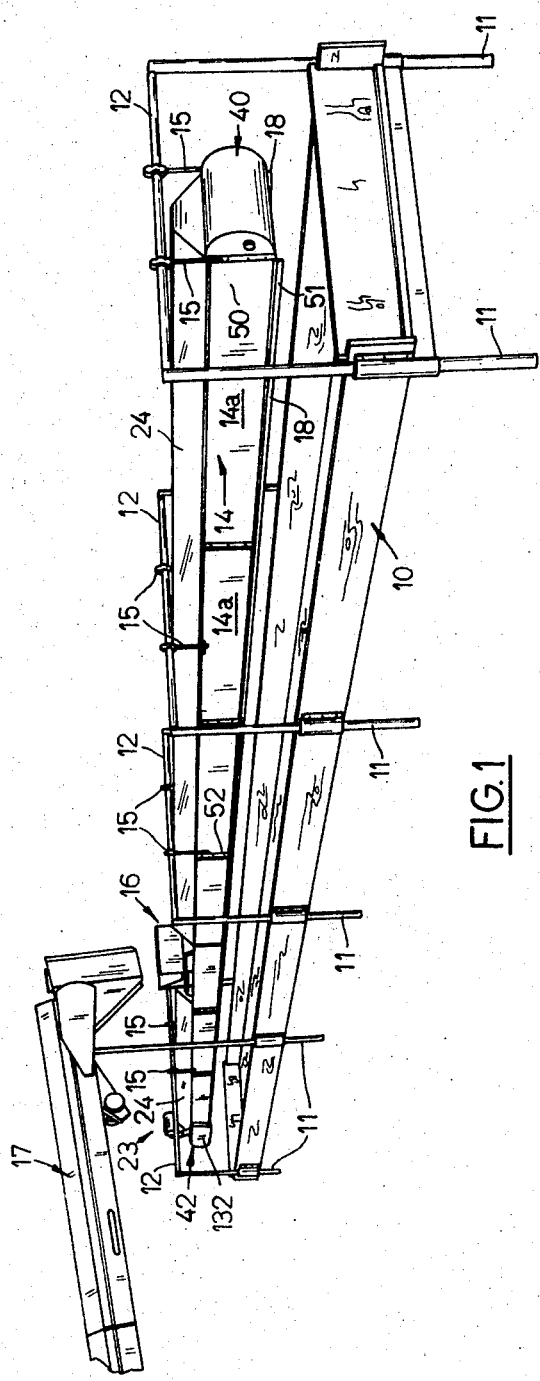

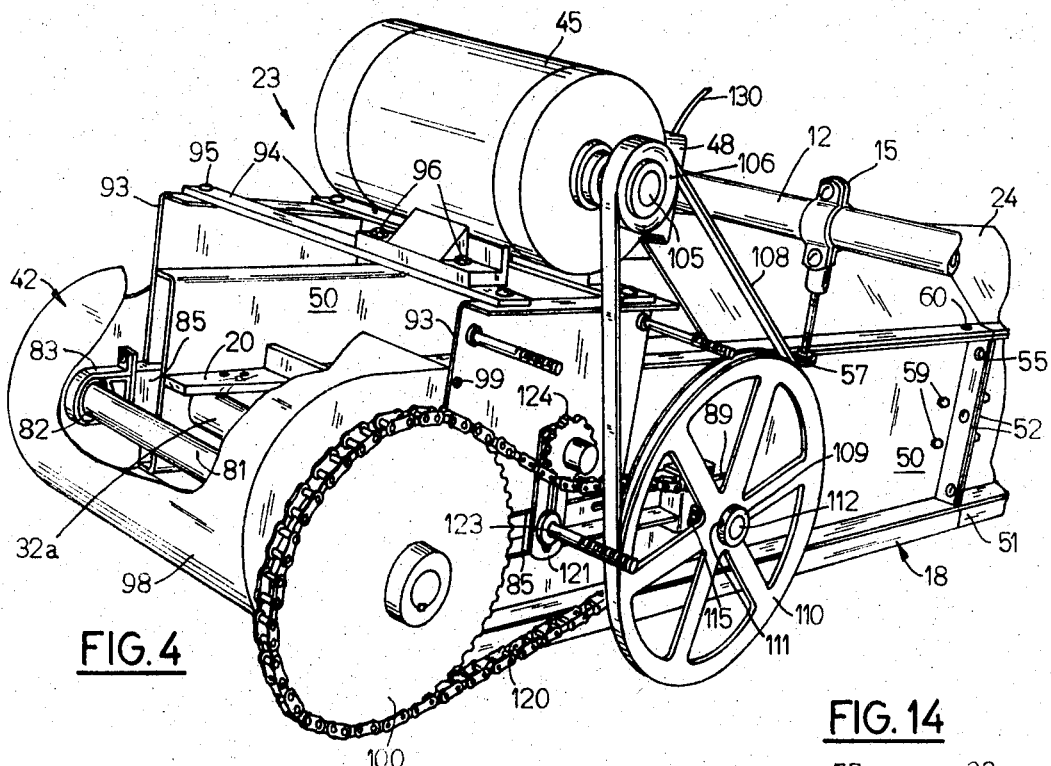
FIG. 4
FIG. 14
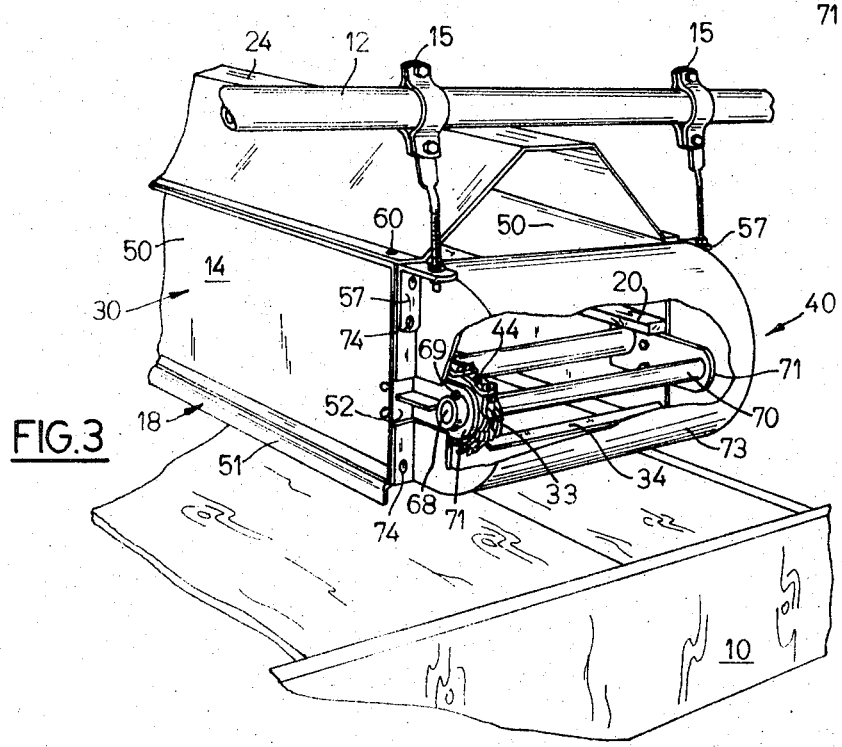
FIG. 3

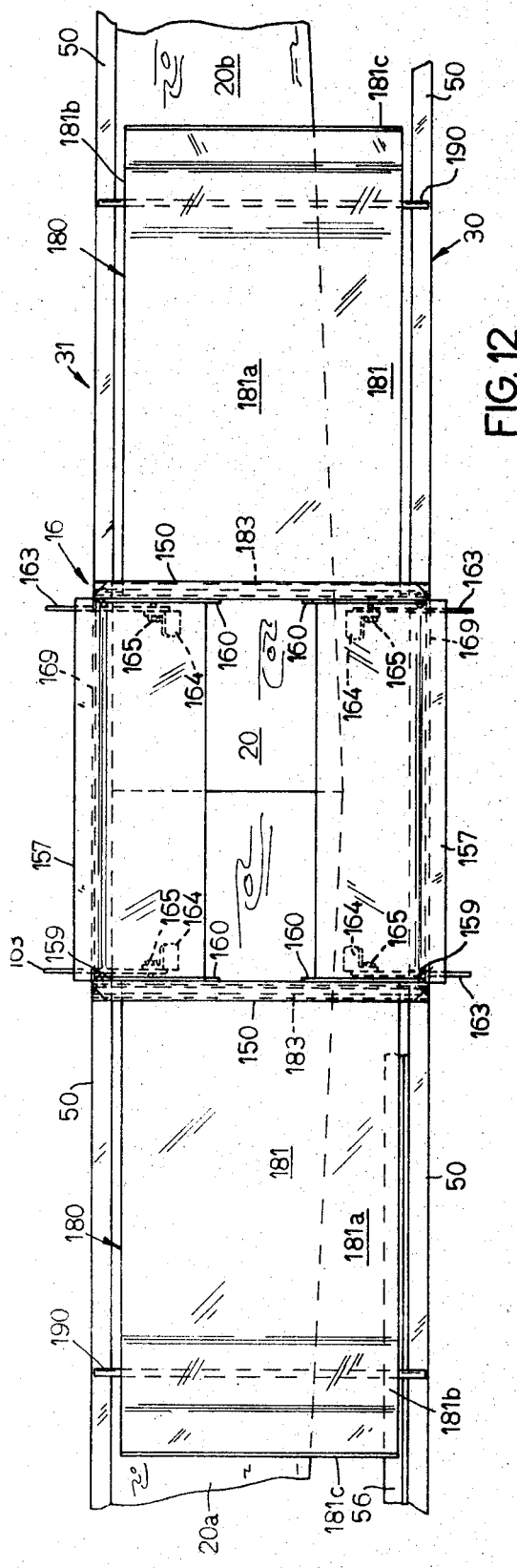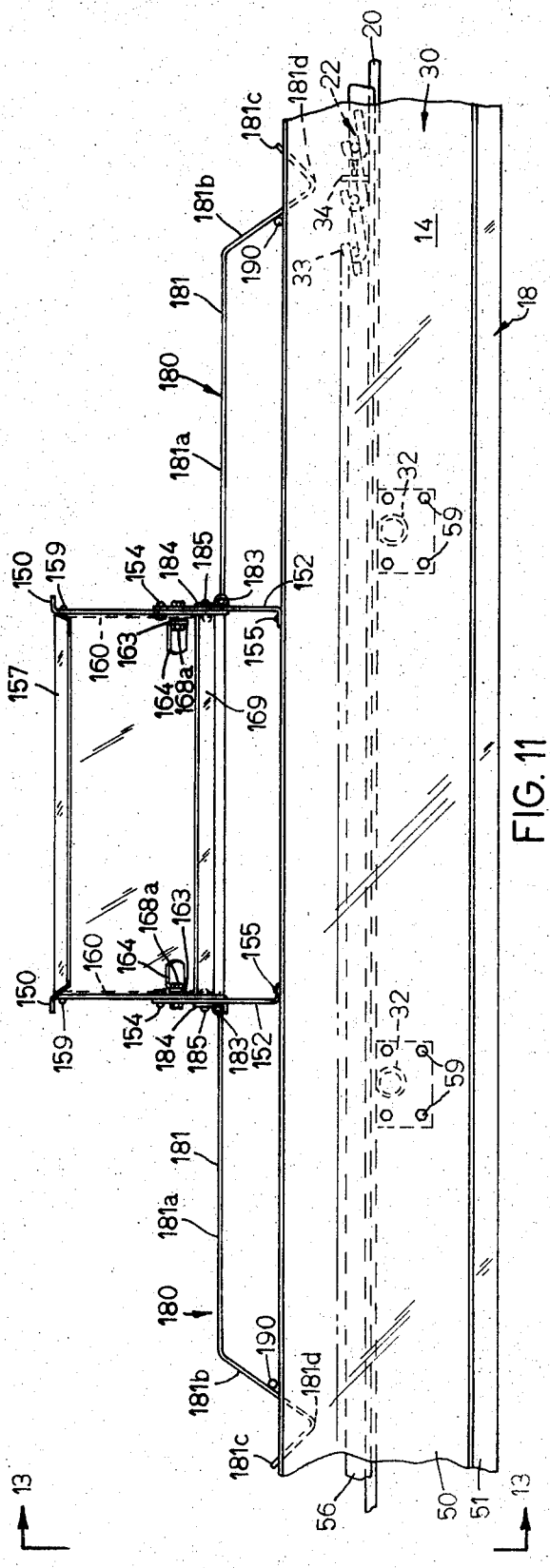

OVERHEAD FEEDER CONVEYOR HAVING DOUBLE-TAPERED BED, REVERSIBLY DRIVABLE CHAIN-FLITE ASSEMBLY

BACKGROUND OF THE INVENTION

1. Field of Use

This invention relates generally to chain-flite type overhead feeder conveyors for receiving comminuted material, such as cattle feed, from a hopper and for distributing it evenly along an elongated trough or cattle feeding bunk located below the conveyor.

2. Description of the Prior Art

In the mass feeding of cattle it is common practice to employ an elongated trough or feeding bunk having an elongated overhead feeder conveyor located thereabove and operable to distribute the feed evenly along the entire length of the bunk. U.S. Pat. No. 3,625,184 issued Dec. 7, 1971 to Paul Patz for "Straight Line Overhead Cattle Feeder" disclosed one type of overhead bunk feeder wherein feed in the form of grain or silage is supplied from a stationary supply conveyor located above the center of the bunk to an overhead traveling bunk feeder conveyor which is reciprocably movable back and forth for the length of the bunk to distribute the feed evenly therealong. It is also known to employ an overhead bunk feeder or conveyor of the type wherein a motor driven chain-flite assembly moves the feed along a tapered bed to distribute it evenly along the bunk. In the latter arrangement the chain-flite assembly is driven in one direction by a motor located at one end of the feeder conveyor and the stationary supply conveyor is located above that same end. If the latter type of overhead bunk feeder is used with a relatively long bunk, it is necessary to provide a relatively long and heavy chain-flite assembly and a relatively large motor to drive the assembly. While both of the aforedescribed overhead bunk feeders are generally satisfactory for their intended purpose, the type which employs a reciprocably movable traveling bunk feeder conveyor is a relatively complex machine. On the other hand, in the chain-flite type feeder conveyor employing a single-tapered bed there are practical limits on the rate at which the feed can be distributed by a machine of given size and operating speed. In the latter machine it is necessary to increase the size and operating speed of such conveyors in order to increase their rate of distribution. This results in increased manufacturing costs for the conveyor and creates a greater likelihood of increased wear and tear and breakdown due to higher operating speeds.

SUMMARY OF THE INVENTION

In accordance with the present invention there is provided an improved elongated overhead bunk feeder conveyor for distributing feed supplied to a hopper and feed leveler (hereinafter referred to as a hopperleveler) located on the conveyor intermediate the ends thereof to an elongated cattle feeding bunk located below the feeder conveyor. The feeder conveyor comprises a rigid framework which is suitably supported above the bunk and on which a double-tapered bed, a chain-flite mechanism and the hopper-leveler are mounted. The double-tapered bed has two tapered sections which extend outwardly from the intermediate (but not necessarily central) location toward the opposite ends of the conveyor. The hopper-lever is mounted intermediate the length of the bed. The chain-flite mechanism employs a single endless chain which extends substantially the entire length of the feeder conveyor alongside the bed and is reeved around sprockets mounted on the framework at opposite ends of the feeder conveyor. Flites are attached to the chain at spaced apart intervals therealong and extend transversely of the bed and serve to push feed off the tapered edge of the bed as the chain advances. One of the sprockets is an idler sprocket and the other sprocket is driven by a reversible electric motor. Manually operable motor control means are provided to enable selective operation of the motor and chain in opposite directions.

In operation feed is supplied to the hopper-leveler by, for example, a suitable conventional conveyor. Feed is deposited from the hopper onto the bed and then moved therefrom by the flites along a tapered section of the bed, depending on which direction the chain is being driven. Reversal of the direction of chain movement causes feed to be moved along the other tapered bed. In this manner feed is distributed along the entire length of the bunk. The hopper of the hopper-leveler comprises means to deposit feed on the intermediate section of the bed and leveler means are located on each of the opposite ends thereof to level the feed being supplied from the intermediate location of the bed toward either end of the bed.

A feeder conveyor in accordance with the invention enables feed to be distributed evenly and at different rates along the entire length of a relatively long bunk and obviates the need for larger components and heavier duty motors which would otherwise be required in feeder conveyors adapted to supply a bunk of the same size. Furthermore, the feeder conveyor in accordance with the invention employs a single chain instead of the two chains usually employed in chain-flite conveyors, and since the chain is reversible to supply opposite sections of a bunk, it can be used to supply either or both sections of the bunk as the situation requires. Also, a feed conveyor in accordance with the invention avoids the necessity of duplicate motors and other components which would otherwise be required to supply opposite sections of a relatively long bunk. Other objects and advantages of the invention will hereinafter appear.

DRAWINGS

FIG. 1 is a perspective view of a cattle feed bunk and an overhead feeder conveyor therefor in accordance with the invention;

FIG. 2 is a top plan view of the feeder conveyor shown in FIG. 1 with portions omitted to show interior details;

FIG. 3 is an enlarged perspective view, with portions broken away, of the idler sprocket assembly at the right end of the feeder conveyor shown in FIG. 1;

FIG. 4 is a view similar to FIG. 3 but showing the drive sprocket assembly and drive means therefor at the left end of the feeder conveyor shown in FIG. 1;

FIG. 11 is a side elevation view of the adjustable hopper-leveler assembly;

FIG. 12 is a top plan view of the adjustable hopper-leveler assembly;

FIG. 14 is an enlarged front elevation view of the idler sprocket shown in FIG. 3; and FIGS. 15, 16, 17 and 18 are top plan views of alternative shapes of bed sections usable in a conveyor in accordance with the present invention.

DESCRIPTION OF A PREFERRED EMBODIMENT

General Arrangement

Figure 5:
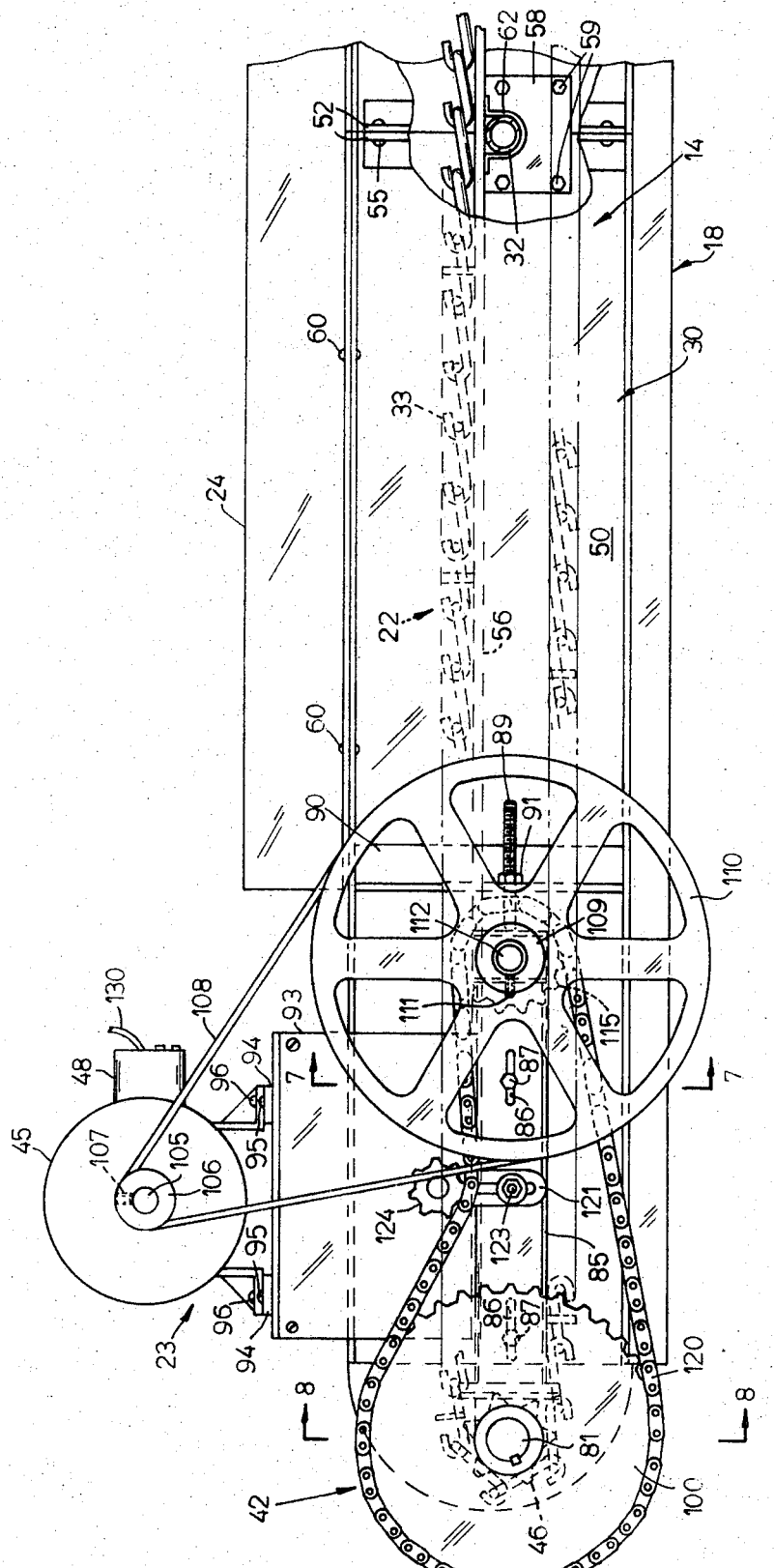
FIG. 5 is a side elevational view of the drive sprocket assembly and drive means shown in FIG. 4.

Referring to FIG. 1, there is shown an elongated cattle feeding trough or feed bunk 10 which is supported above ground by a plurality of spaced apart frame members 11, each of which includes a cross bar 12. An elongated feeder conveyor 14 in accordance with the invention is supported above bunk 10, being rigidly attached to the cross bars 12 of the frame members 11 by adjustable support brackets 15. The feeder conveyor comprises an adjustable hopper-leveler 16 located intermediately of the ends of feeder conveyor 14 and cattle feed in the form of grain or silage is supplied to the hopper-leveler by means of a fixed or stationary conventional overhead conveyor 17. As hereinafter explained in detail, feeder conveyor 14 operates in such a manner that feed supplied thereto from hopper-leveler 16 is distributed along the entire length of bunk 10, first along one portion of the bunk on one side of the hopper-leveler and then along the other portion of the bunk on the opposite side of the hopper-leveler. The hopper-leveler 16 is shown located at a location intermediate the opposite ends of feeder conveyor 14 about one-third of the length of the conveyor in from one end thereof but could be centrally located or located at some other position. It may be assumed for purposes of illustration that bunk 10 and feeder conveyor 14 are co-extensive and that each is about 60 feet long.

Generally considered, with reference to FIGS. 1 through 8, feeder conveyor 14 comprises a rigid supporting framework 18 on which the hopper-leveler 16, a double tapered bed 20, a chain flite assembly 22, drive means 23 for reversibly driving the chain flite assembly, and a cover 24 are mounted. For convenience and versatility, supporting framework 18 and cover 24 may be constructed in short interconnectable lengths so as to enable fabrication of a feeder conveyor of any desirable length. As FIGS. 3, 5, 6, 7 and 8 show, supporting framework 18 comprises a pair of spaced apart sides 30 and 31 which are rigidly joined together at intervals therealong by cross braces 32 and 32a. The double tapered bed 20 comprises two tapered sections 20a and 20b which extend toward opposite ends of feeder conveyor 14 from a location intermediate the opposite ends of the feeder conveyor and whereat feed is deposited on the bed by the hopper-leveler 16. Chain-flite assembly 22 employs a single endless expandable link type chain 33 which extends substantially the entire length of the feeder conveyor 14 alongside the tapered edge of bed 20. Chain 33 is provided with flites 34 which are rigidly attached thereto at spaced apart intervals therealong and extend transversely of bed 20. Chain 33 is supported so that the flites 34 on the upper side of the chain slide along the upper surface of bed 20 and the flites 34 on the lower side of the chain travel beneath the bed as the chain is moved in either direction. Chain 33 is supported by sprocket assemblies 40 and 42 which are located at opposite ends of feeder conveyor 14. Sprocket assembly 40 comprises an idler sprocket 44 about which chain 33 is reeved. Sprocket assembly 42 comprises a driven sprocket 46 about which chain 33 is reeved. Drive means 23, including a reversible electric motor 45, are associated with sprocket assembly 42 and drive the driven sprocket 46 so as to move chain 33 and the flites 34 thereon in either direction. A manually operable motor control in the form of a push-button switch 48 is provided for motor 45 to enable the operator to select the direction of chain-flite travel and to effect instant reversal thereof, as desired.

In operation, feed is supplied to the hopper-leveler 16 by conveyor 17. Feed is deposited from hopper-leveler 16 onto the intermediate location of bed 20 of feeder conveyor 14 and then moved therefrom by the flites 34 along one or the other of the tapered sections 20a or 20b of bed 20, depending on which direction chain 33 is being driven by motor 45. Reversal of the direction of motor rotation and chain movement by use of switch 48 causes feed to be moved from the intermediate location along the other tapered section of bed 20. In this manner feed is distributed along the entire length of bunk 10, first along one end section and then along the other. As hereinafter described, hopper-leveler 16 comprises means to deposit feed on bed 20 and also has feed leveler means on opposite ends thereof to level the feed being moved from the intermediate location of the bed toward either end of the bed by the chain-flite assembly.

The Supporting Framework

The supporting framework 18 serves as the basic support for all stationary and movable components forming conveyor 14 and also serves as the means by which the conveyor is supported or suspended over bunk 10. As hereinbefore mentioned the supporting framework 18 is constructed of modular, interconnectable components, sections or units such as 14a in FIG. 1. In the embodiment shown, seven such units are employed. The supporting framework 18 in each unit comprises a pair of spaced apart sides 30 and 31 which are rigidly joined together at intervals therealong by cross braces 32 and 32a. Each side 30 and 31 comprises a side member 50 in the form of a channel shaped length of sheet metal which has a stiffening or strengthening member 51 in the form of a length of angle iron welded along the lower edge thereof. Vertically disposed coupling members 52 are welded to the outside of channel members 50 near the ends thereof to enable two adjacent sections such as 14a to be secured togehter in end to end relationship as by bolts 55. Side 30 of supporting framework 18 is provided with a chain support member 56 which takes the form of a length of angle iron which is welded to the inside surface of side member 50. As FIG. 4 shows, bracket members 57 are rigidly secured where necessary along the sides 30, 31 (or at the ends of a section) and are part of or connected to the brackets 15. The cross braces 32 take the form of tubular members which are rigidly secured as by welding to support brackets 58 which themselves are secured to the interior sides of the side members 50 by bolts 59. The cross braces 32a are welded directly to the side members 50. Cover 24 takes the form of one or more lengths of curved or upwardly bowed sheet metal which are secured to the upper flanges of the side members 50 by bolts 60.

Double Tapered Bed

The double tapered bed 20 comprises two tapered sections 20a and 20b which extend toward opposite ends of feeder conveyor 14 from a location intermediate the opposite ends of the feeder conveyor and whereat feed is deposited on the bed by the hopper, as FIG. 2 shows. It is to be noted that bed 20 comprises a relatively large intermediate location, section or area and therefore provides a region or location on the bed on which feed can be deposited from hopper-leveler 16 without immediately spilling therefrom into bunk 10 prior to even distribution. The bed 20 may be made of sheet metal, sheets of plywood, or other materials and cut at a suitable angle determined by bed width and length. Bed 20 rests on the cross braces 32 and 32a of supporting frame work 18 and is rigidly secured to braces 32 by brackets 62 and screws 63, as FIGS. 5, 6, 7 and 8 show. To increase the working life of bed 20 and to facilitate movement of the flites 34 and feed along the upper bed surface, that surface may be treated with an anti-friction coating, preferably in the form of a plastic coating, which is painted thereon and allowed to dry during manufacture of the bed. It is to be noted that the bed sections 20a and 20b differ in length from each other and that consequently the angles of the tapered edges thereof also differ. It should also be noted that chain 33 is disposed along the tapered edges of bed 20 (and positioned above and below the bed) and that the straight edge of bed 20 abutts the inside surface of a channel member 50 so that feed is unable to fall from the bed into bunk 10.

Sprocket Assembly

As FIGS. 3 and 4 show, the idler sprocket assembly 40 located at one end of feeder conveyor 14 comprises idler sprocket 44 about which chain 33 is reeved. Idler sprocket 44 is rotatably mounted on and near one end of an idler sprocket shaft 70 which has its ends supported on support brackets 71 which are rigidly attached to the coupling members 52 at the end of feeder conveyor 14. A collar 72 having a set screw maintains sprocket 44 in proper position on shaft 70 and spacer washers 75 are disposed between the sprocket and a support bracket 71. Shaft 70 is secured in place by a pin 69 which extends through the shaft and a collar 68 on the shaft. A cover 73 is provided for sprocket assembly 40 and is detachably secured to the end of feeder conveyor 14 by bolts 74.

As FIGS. 4 through 8 show, the drive sprocket assembly 42 located at the other end of feeder conveyor 14 comprises a chain drive sprocket 46 which is rigidly secured, as by a set screw 80, near one end of and is rotatable with a drive shaft 81 which has its ends journaled for rotation in anti-friction bearings 82 which are mounted on pillow blocks 83. Each pillow block 83 is rigidly secured to one end of a channel-shaped adjustable support member 85 which is provided with slots 86 for receiving bolts 87 to secure member 85 to the outside of the channel member 50. Loosening of the bolts 87 permits both members 85 to be slidably moved forward or rearward to maintain the proper amount of slack in chain 33. The construction and arrangement of the members 85 also facilitates attachment or detachment of chain 33 during assembly or disassembly of feeder conveyor 14. A set screw 89 for locating and holding member 85 in a precise location bears against the rear end of member 85 and is in threaded engagement with and extends through a threaded hole in the forwardly facing flange of a member 90 which is welded to the outside of channel member 50. An adjusting nut 91 is provided on the set screw.

Each member 85 has an upwardly extending motor support plate 93 rigidly secured thereto as by welding and motor mount bars 94 are rigidly connected between the plates as by bolts 95. Motor 45 is adjustably secured to the bars 94 by bolts 96.

A cover 98 is provided for sprocket assembly 42 and is detachably secured to the end of the feeder conveyor by bolts 99. One end of drive shaft 81 extends through its bearing 82 to a point outwardly of a side of feeder conveyor 14 and a relatively large driven roller chain sprocket 100 is rigidly secured to the shaft.

The Chain-Flite Assembly

Figure 6:
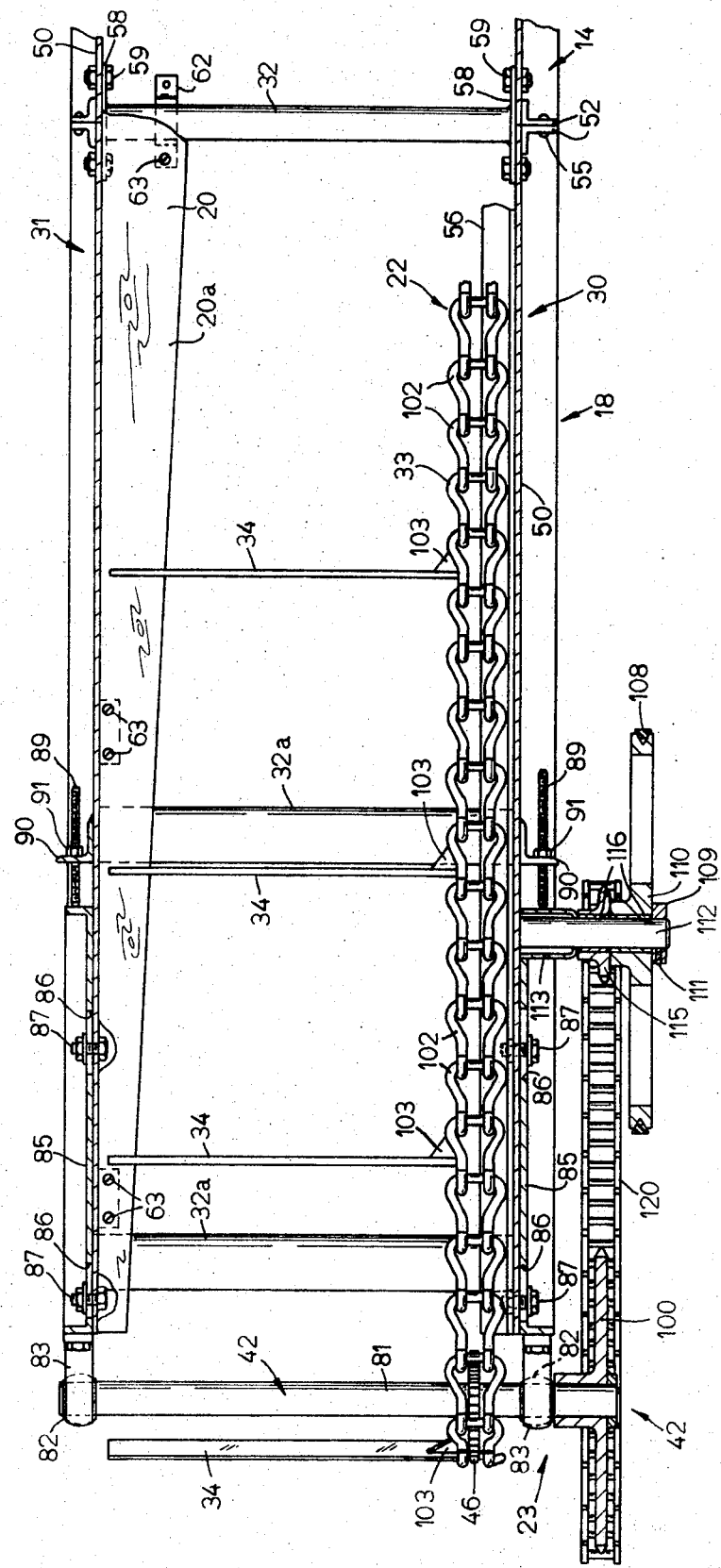
FIG. 6 is a top plan view of the apparatus shown in FIG. 5.
Figure 7:
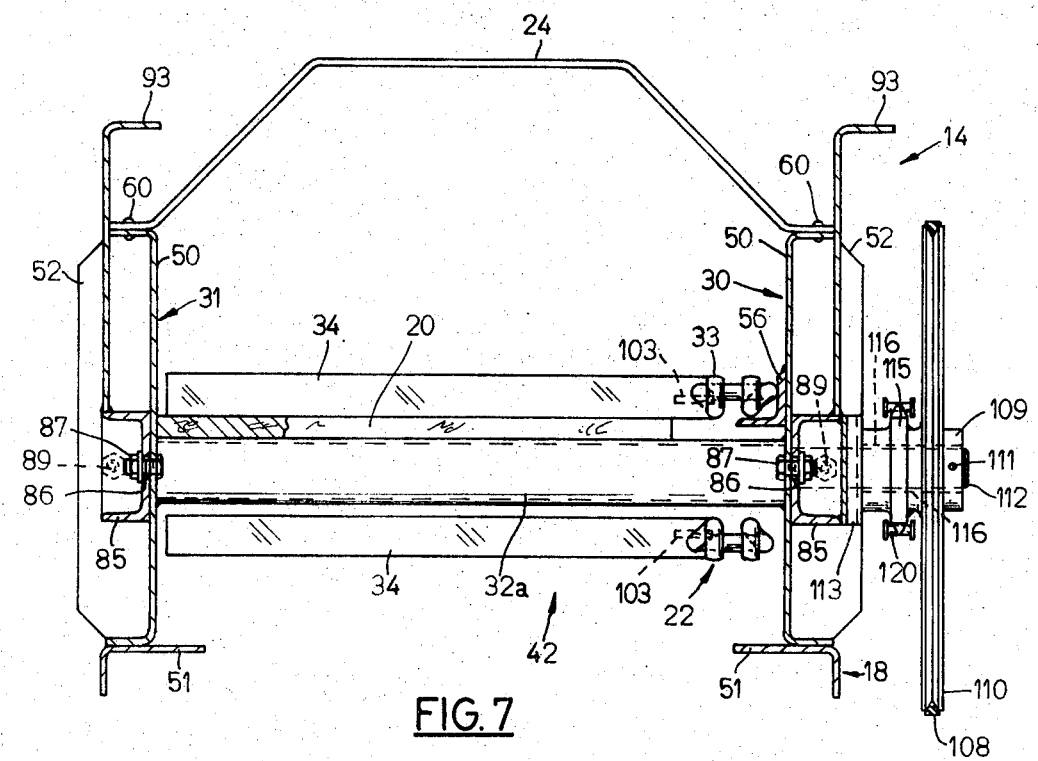
FIG. 7 is an enlarged cross-section view taken on line 7—7 of FIG. 5.
Figure 8:
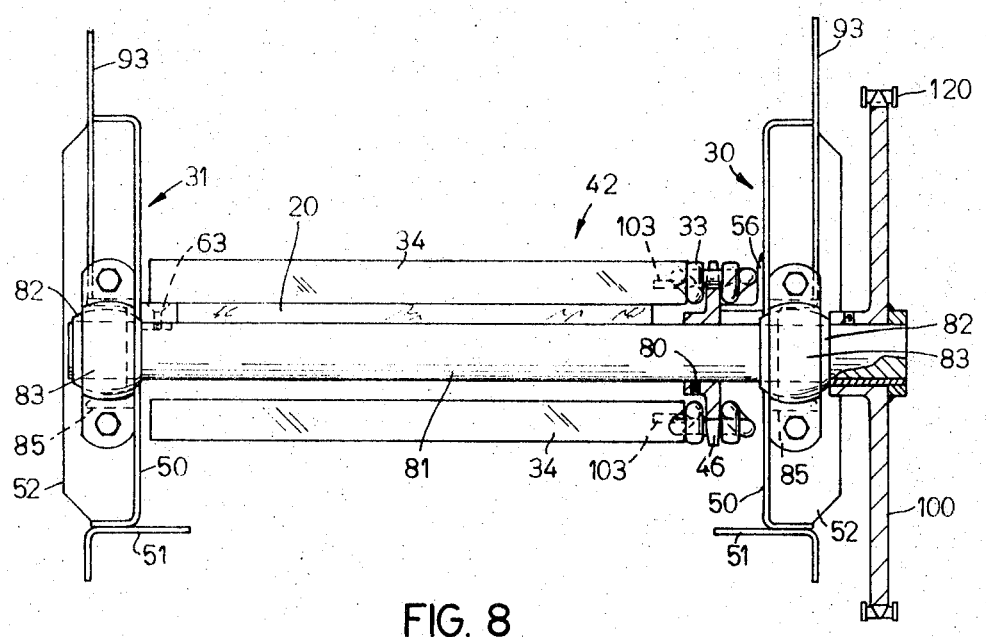
FIG. 8 is an enlarged cross-section view taken on line 8—8 of FIG. 5.
Figure 9:
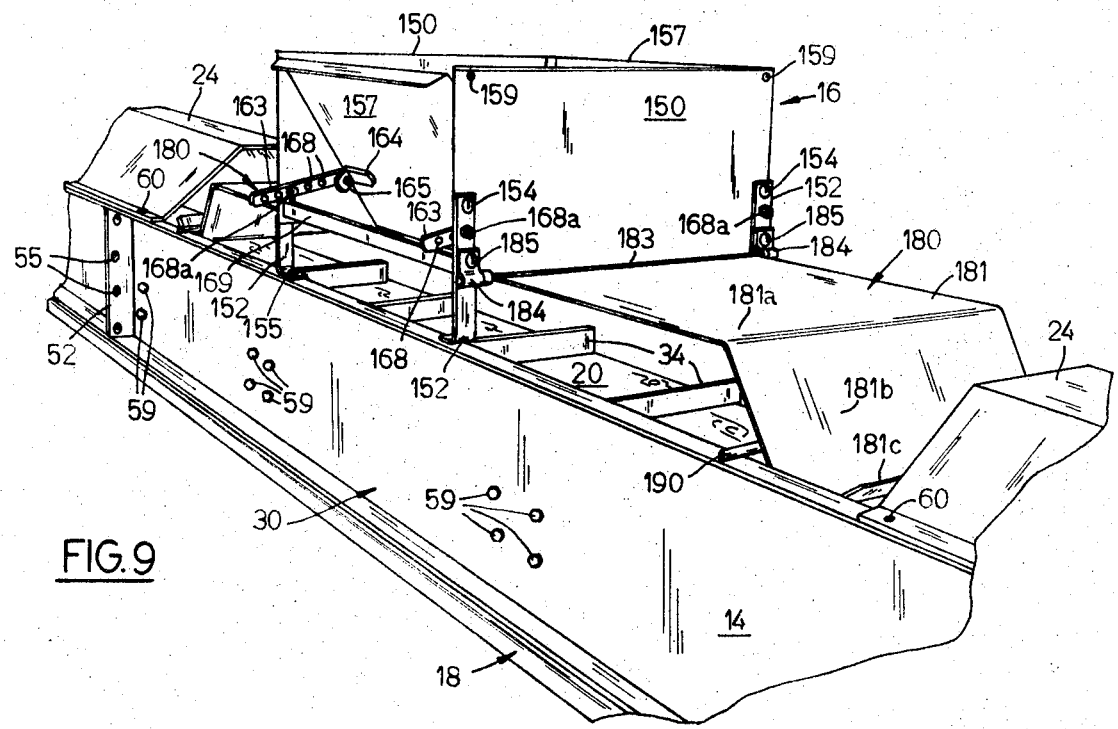
FIG. 9 is a perspective view of the adjustable hopper-leveler assembly for the feeder conveyor showing the levelers in lowered operating position.

As FIGS. 5, 6 and 7 show, the chain-flite assembly 22 comprises a single endless link type chain 33 which extends substantially along the entire length of feeder conveyor 14 alongside the tapered edges of bed 20. The chain comprises individual generally U-shaped links 102 and adjacent links are flexibly interconnected. Chain 33 is provided with the flites 34 which are rigidly attached to the chain at spaced apart intervals therealong and extend transversely of bed 20. Each flite 34 takes the form of a flat rectangular piece of metal which has one end welded to an associated link 102 and a generally triangularly shaped gusset 103 is welded between each flite and its associated link to strengthen the connection. Chain 33 is reeved around the sprockets 44 and 46 and the upper side of the chain slides along chain support member 56. Those flites 34 on the upper side of the chain slide along the upper surface of bed 20 and those flites on the lower side of the chain travel beneath the bed as the chain is moved in either direction.

The Drive Assembly

As FIGS. 4 through 8 show, reversible electric motor 45, which, for example, is a two horse-power single-phase instant reversal motor of a conventional type, is rigidly mounted on the motor mount bars 94 at and above one end of feeder conveyor 14. The shaft 105 of motor 45 is provided with a relatively small pulley 106 which is secured thereto by a set screw 107. A V-belt 108 is reeved around pulley 106 and also around a relatively larger pulley or sheave 110 which is rigidly connected as by welding to a relatively small sprocket 115 and both are rotatable on bushings 116 on an intermediate stub shaft 112 which is stationarily mounted on a support 113 on the side 30 of feeder conveyor 14. A collar 109 having a set screw 111 is disposed on the end of shaft 112 to maintain the sheave 110 on the shaft. A roller chain 120 is reeved around sprocket 115 and around the larger sprocket 100. An adjustably movable idler sprocket 124 is rotatably mounted on a bracket 121 provided on member 85 on supporting framework 18 and engages the upper side of roller chain 120. Idler sprocket 124 is adjustably movable, as by loosening bolt 123, to adjust the tension of roller chain 120.

Motor 45 is supplied with electrical power from a suitable source through an electrical cable 130 and is controlled for operation in either forward or reverse direction by control means, including a conventional on-off and motor reversal switch 48. Switch 48 is mounted on the motor 45, as shown, so as to be readily accessible to the person operating the feeder conveyor 14, but could be located in some other convenient or desirable location. The V-belt 108 and roller chain 120 of drive assembly 23 and the associated pulleys and sprockets are provided with a protective cover 132, as shown in FIG. 1.

The Adjustable Hopper-Leveler Assembly

The reversibly drivable chain-flite assembly 22 of feeder conveyor 14 is capable of distributing feed alternately in opposite directions from the intermediate location on bed 20 above which adjustable hopper-leveler 16 is located. Hopper-leveler 16 receives feed from stationary conveyor 17, deposits it on bed 20 at an intermediate location thereon, and levels the feed as it is moved or transported in either direction from the intermediate location by the flites 34. Hopper-leveler 16 is mounted on top of supporting framework 18 and cover 24 is omitted in this region.

As FIGS. 9 through 13 show, the adjustable hopper-leveler 16 comprises a pair of spaced apart stationary upright end walls 150 to which generally L-shaped mounting brackets 152 are secured by bolts 154. The brackets 152 are attached to feeder conveyor 14 by bolts 155. The end walls 150 may be rigidified by two rigid bars 169 which extend therebetween and are secured thereto by bolts 185. A pair of spaced apart generally upright, but inwardly and outwardly pivotably movable side walls 157 are mounted between the pair of end walls 150, as by bolts 159 which extend through holes in the end wall and through holes in inwardly turned side flanges 160 along the side edges of the side walls. Each side wall 157 is independably positionable with respect to the other so as to adjust the bottom spacing therebetween and, thereby, the direction of feed being deposited from hopper-leveler 16 onto bed 20. More specifically, adjustably swinging and locating both movable side walls 157 in the same direction to a desired position has the effect of directing the feed to a desired part of the intermediate portion of bed 20. Each movable side wall 157 is provided on its outside surface (and near its end edges) with a pair of L-shaped brackets 164 which are welded thereto. A flat positioner bar 163 is pivotally connected at its inner end by means of a bolt 165 to a bracket 164. Each positioner bar 163 is provided with a series of spaced apart holes 168 therethrough. Each hole 168 in a positioner bar 163 is engageable by a bolt 168a which extends through holes in an end wall 150 and in an associated bracket 152. Thus, with the bolts 168a removed, each side wall 157 can be moved to an appropriate position and then rigidly secured in place therein by insertion of the associated bolts 168a through the appropriate holes 168 in the positioner bars 163 for that side wall.

If preferred, each positioner bar 163 can take the form of an L-shaped member having an elongated hole or slot instead of a series of spaced apart holes 168 for engagement by bolt 168a. In such case, the positioner bar need not be pivotally connected as by bracket 164, to a side wall 157 but need only bear thereagainst to maintain the side wall in adjusted position, i.e., to prevent the wall from swinging outwardly.

Figure 10:
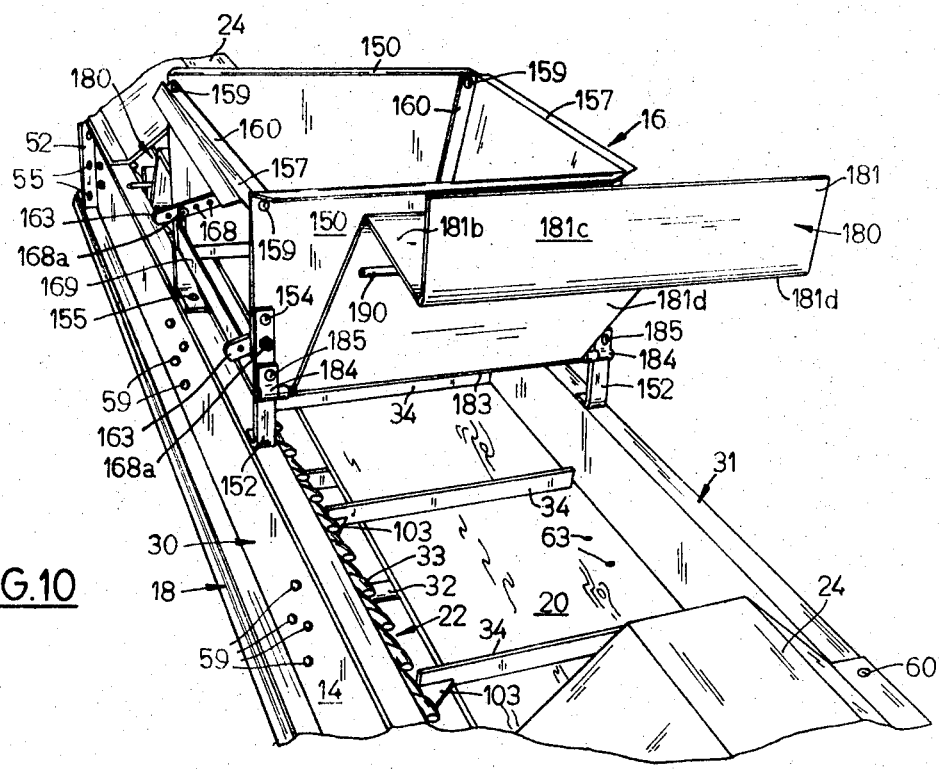
FIG. 10 is a view similar to FIG. 9 but showing one leveler in raised position.
Figure 13:
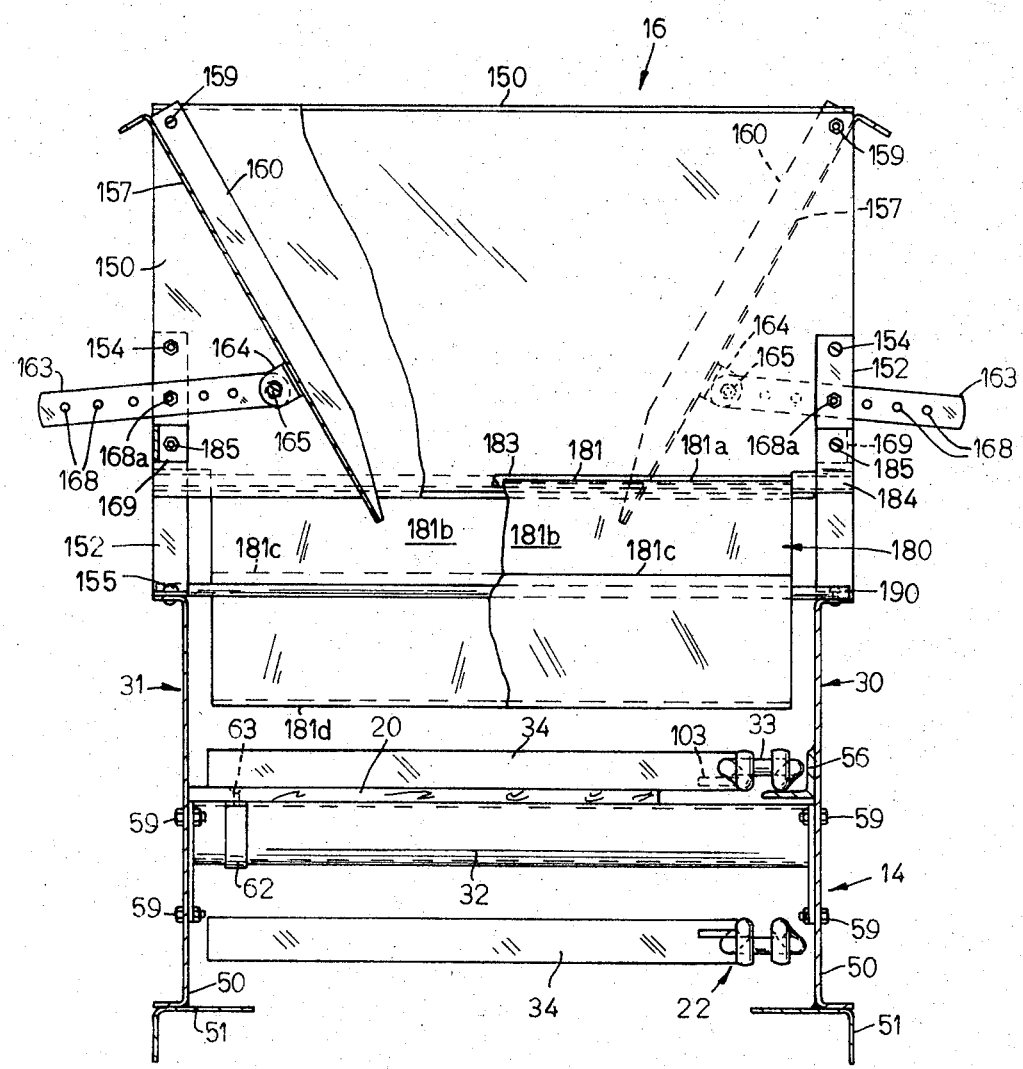
FIG. 13 is an enlarged cross-section view taken on line 13—13 of FIG. 11.

Feed levelers 180 are provided at opposite ends of hopper-leveler 16 and are pivotably connected thereto. Each leveler 180 comprises a leveler member 181 in the form of a piece of rigid sheet metal having a generally flat upper portion 181a, a downwardly depending intermediate portion 181b, and an upwardly extending end portion 181c. Portions 181b and 181c cooperate to define a leveling edge 181d along the underside of the leveler 180. Upper portion 181a is provided at the edge thereof closest to the associated hopper end wall 150 with a pivot shaft or bar 183 which is welded thereto and has its ends journaled in hinges 184 which are rigidly secured by bolts 185 to the brackets 152 at the associated end wall 150. Each leveler member 181 has a support bar 190 which is rigidly secured as by welding to the undersurface of intermediate portion 181b and which extends sufficiently far beyond each side thereof so as to be able to rest on the top edges of the sides 30 and 31 of feeder conveyor 14. When the levelers 180 are in working position, leveling edge 181d is positioned a very small distance above the flite passing therebeneath, as FIG. 11 shows. Thus, if a mound of feed is being moved along by a flite 34 beneath the edge 181d, the top of the mound is scraped back into the space ahead of the next oncoming flite 34. This spreads the feed across the width of the bed to assure the even distribution of feed along the length of the bunk. Each leveler 180 is movable between its operating position wherein it is supported just above the flites 34 and a raised position, as shown in FIG. 10, whereby limited access to the interior of conveyor 14 is afforded to the operator. The levelers 180 also served as a protective cover for that portion of bed 20 which is not provided with a conventional cover 24.

OPERATION

Assume initially that the stationary conveyor 17 and feeder conveyor 14 are not in operation and that no feed is being supplied to hopper-leveler 16. Further assume that the movable side walls 157 of hopper-leveler 16 have been adjusted or placed in a desired position by the operator and that the levelers 180 are down and in operating position. The operator then actuates switch 48 to cause motor 45 to rotate in the desired direction and move chain-flite assembly 22 in the desired direction. After this, the operator actuates stationary conveyor 17 to continuously supply feed to hopper-leveler 16. Feed is deposited from hopper-leveler 16 onto the intermediate section of bed 20 and is moved by the flites 34 on the upper side of chain 33 from the intermediate location toward one end of the conveyor along section 20a or 20b of bed 20. As feed is moved by the flites 34 beneath edge 181d of the leveler 180 associated with the bed section in question, leveling of the feed occurs as hereinbefore described. As the flites 34 continue to move feed along either tapered section 20a or 20b of bed 20, feed spills off the tapered edge and into bunk 10 and is evenly distributed along that section of the bunk being supplied. When that one section of bunk 10 has been supplied with a desired amount of feed the operator actuates switch 48 to effect instant reverse rotation of motor 45 and instant reversal in direction of movement of chain-flite assembly 22. When this reversal occurs, feed is moved by the flites 34 from the intermediate location, where it is still being deposited from hopper-leveler 16, toward the other end of feeder conveyor 14 along the other tapered section of bed 20. The leveler 180 on that side of feeder conveyor 14 performs its leveling function, as hereinbefore described, and feed is spilled from the tapered edge of the bed section into that section of the bunk located therebelow. When a sufficient amount of feed has been evenly distributed in that section of bunk 10, the operator turns off stationary conveyor 17 so that feed is no longer supplied to hopper-leveler 16, and when all feed deposited in the intermediate location has been distributed the operator turns off feeder conveyor 14.

The aforedescribed cycle of operation may be repeated as often as necessary to fill bunk 10. It is also apparent that the operator can elect to fill either section of the bunk without necessarily filling the other section.

It will be apparent to those skilled in the art that, although a double-tapered bed 20 having individual triangularly shaped tapered sections 20*a* and 20*b* is disclosed and described in detail throughout the specification in connection with the preferred embodiment, bed sections of a shape other than triangular are encompassed by the term "tapered." For example, any bed section having an operative width or widths of generally decreasing dimension in the direction in which the cooperating flites move, and defining an edge or edges from which material may fall, such as the step-shaped bed section 20*d* shown in FIG. 15, the slotted bed section 20*e* shown in FIG. 16, and the curve-edged bed section 20*g* shown in FIG. 18 are each to be considered a tapered bed section for purposes of this specification and a bed comprising two such sections appropriately disposed in end-to-end relationship is to be considered a double-tapered bed. Similarly, a perforated bed section 20*f* shown in FIG. 17 is to be considered as within the scope of the present invention.

I claim:

1. A conveyor for distributing feed along a feed bunk located therebelow comprising: a double-tapered bed which narrows widthwise in opposite directions toward opposite ends of said conveyor from a location intermediate said conveyor ends where feed is deposited on said bed; first means comprising a plurality of spaced apart interconnected flites extending transversely over said bed and movable in unison alternately in either direction along substantially the entire length of said bed; and second means for selectively moving said flites in either direction to move feed deposited on said bed at said intermediate location along said bed toward either end of said conveyor from whence it is deposited in said bunk.

2. A conveyor for distributing feed along a feed bunk located therebelow comprising: a double-tapered bed which narrows widthwise in opposite directions toward opposite ends of said conveyor from a location intermediate said conveyor ends where feed is deposited on said bed; a feed hopper having a discharge opening located above said intermediate location on said bed; sprockets mounted near the opposite ends of said double-tapered bed; an endless flexible chain reeved about said sprockets and arranged along substantially the entire length of said double-tapered bed; a plurality of flites attached to said chain at spaced apart intervals therealong, the flites on one side of said chain extending transverse to and over said bed; a reversible electric motor connected to drive said chain; and control means to selectively operate said motor in reverse directions to drive said chain in reverse directions.

3. A conveyor according to claim 2 wherein said one side of said chain is disposed along the tapered edge of said bed.

4. A conveyor according to claim 3 wherein said motor is connected to drive a sprocket at one end of said conveyor.

5. A conveyor for distributing feed along a feed bunk located therebelow comprising: a supporting framework including spaced apart sides; a double-tapered bed supported on said framework between said sides, said bed narrowing widthwise in opposite directions toward opposite ends of said conveyor from a location intermediate the ends of said conveyor where feed is deposited on said bed; said double-tapered bed having a straight edge abutting one side of said framework; a feed hopper mounted on said framework and having a discharge opening located above said intermediate location on said bed; sprockets rotatably mounted on said framework near the opposite ends of said double-tapered bed and near the other side of said framework; an endless flexible chain reeved about said sprockets and arranged along substantially the entire length of said double-tapered bed; said chain having an upper side disposed above said bed and a lower side disposed below said bed; a plurality of flites attached to said chain at spaced apart intervals therealong, the flites on the upper side of said chain extending transverse to and over said bed; a reversible electric motor mounted on one end of said framework and connected to drive one of said sprockets and control means to selectively operate said motor in reverse directions to drive said chain in reverse directions.

* * * * *